(12) United States Patent
Kamiya et al.

(10) Patent No.: US 8,040,010 B2
(45) Date of Patent: Oct. 18, 2011

(54) PERMANENT MAGNET TYPE GENERATOR AND HYBRID VEHICLE USING THE SAME

(75) Inventors: Akinori Kamiya, Hitachi (JP); Noriaki Hino, Mito (JP); Fumio Tajima, Hitachi (JP); Tsutomu Miyoshi, Chiba (JP); Hideki Nihei, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 12/372,752

(22) Filed: Feb. 18, 2009

(65) Prior Publication Data
US 2009/0230802 A1    Sep. 17, 2009

(30) Foreign Application Priority Data

Mar. 13, 2008  (JP) ................. 2008-063456

(51) Int. Cl.
*H02K 1/27* (2006.01)

(52) U.S. Cl. ............ 310/156.57; 310/156.53
(58) Field of Classification Search . 310/156.46–156.57
See application file for complete search history.

(56) References Cited

U.S. PATENT DOCUMENTS

| | | | | |
|---|---|---|---|---|
| 6,774,521 B2 * | 8/2004 | Inayama et al. | ......... | 310/156.53 |
| 7,042,127 B2 * | 5/2006 | Tsuruta et al. | ........... | 310/156.53 |
| 7,230,359 B2 * | 6/2007 | Iles-Klumpner | ......... | 310/156.53 |
| 7,420,306 B2 * | 9/2008 | Park et al. | ................. | 310/156.57 |
| 7,612,480 B2 * | 11/2009 | Fujii et al. | ................. | 310/156.53 |
| 2006/0145556 A1 * | 7/2006 | Aota et al. | ................ | 310/156.53 |
| 2007/0018522 A1 * | 1/2007 | Ackva et al. | ............. | 310/156.46 |

FOREIGN PATENT DOCUMENTS

| | | |
|---|---|---|
| JP | 10-126985 | 5/1998 |
| JP | 2001-145284 | 5/2001 |
| JP | 2002-078255 | 3/2002 |
| JP | 2006-101608 | 4/2006 |

* cited by examiner

*Primary Examiner* — Tran Nguyen
(74) *Attorney, Agent, or Firm* — Antonelli, Terry, Stout & Kraus, LLP.

(57) ABSTRACT

The present invention comprises a stator, and a rotor which is disposed oppositely to the stator with a gap interposed. The stator comprises a stator core, and a distributed stator winding mounted to the stator core. The stator core comprises a ring-like yoke core, and a plurality of teeth cores which protrude from the yoke core in the radial direction. The rotor comprises a rotor core, and a plurality of permanent magnets embedded in the rotor core. A pair of non-magnetic portions is created inside the rotor core and on both sides of the circumferential width of a permanent magnet for one magnetic pole. In the rotor core located on the stator side of the pair of non-magnetic portions, a pair of magnetic paths is created as the result of the creation of the pair of non-magnetic portions. Furthermore, a groove or hole is created on the outer circumferential portion of the rotor core and between the adjacent magnetic poles.

8 Claims, 8 Drawing Sheets

PERMANENT MAGNET TYPE GENERATOR AND HYBRID VEHICLE USING THE SAME

CLAIM OF PRIORITY

The present application claims priority from Japanese patent application serial No. 2008-063456, filed on Mar. 13, 2008, the content of which is hereby incorporated by reference into this application.

FIELD OF THE INVENTION

The present invention relates to a permanent magnet type generator and a hybrid vehicle that uses the permanent magnet type generator.

BACKGROUND OF THE INVENTION

Improved efficiency is required for a permanent magnet motor generator. Specifically, it is sometimes required that the power factor of a motor generator in a high-speed overload area be improved. With regard to a permanent magnet type motor generator, patent document 1 has disclosed the technology wherein when the magnetic flux axis of the permanent magnet is considered as a d-axis and an axis perpendicular to the d-axis is considered as a q-axis, the power factor can be increased by notching the q-axis side of the outer circumferential surface of the rotor core.

Furthermore, patent documents 2 and 3 have disclosed the configuration of a motor generator related to patent document 1.

Furthermore, reduction in the volume of a permanent magnet which accounts for a large portion of cost structure is required, and patent document 4 has disclosed the configuration of an embedded permanent magnet type motor generator. According to patent document 4, magnetic flux of the permanent magnet is increased to reduce the d-axis side reactance and simultaneously the q-axis side reactance is reduced Therefore, as the result of reduction of magnetic flux that generates reluctance torque, reactance in the high-speed load area is reduced thereby improving the power factor.

[Patent document 1] Japanese Patent Laid-Open No. 2006-101608
[Patent document 2] Japanese Patent Laid-Open No. 2002-78255
[Patent document 3] Japanese Patent Laid-Open No. 2001-145284
[Patent document 4] Japanese Patent Laid-Open No. Hei 10 (1998)-126985

SUMMARY OF THE INVENTION

As for a permanent magnet motor generator, specifically, a permanent magnet motor generator used for driving a vehicle, it is required that the permanent magnet motor generator be small and have high output including the inverter device which is a control circuit of the permanent magnet motor generator. Specifically, it is most desirable to have a permanent magnet motor generator which can output high torque when rotating at low speed and produce high output when rotating at high speed. For this reason, an embedded permanent magnet type motor generator with an auxiliary salient pole is mostly used because field-weakening is possible during high-speed revolution and also reluctance torque can be utilized.

When a permanent magnet type motor generator is co-rotated by a vehicle, for example, during deceleration such as the vehicle's coasting operation and braking operation or when the vehicle is driven by an alternative drive source, magnetic flux of the permanent magnet generates induced voltage in the stator winding. The induced voltage is proportional to the number of revolutions. Therefore, maximum induced voltage of the permanent magnet type motor generator is determined according to the maximum number of revolutions. When creating the electrical design of the permanent magnet type motor generator, it is necessary to design the motor generator so that the peak induced voltage of the permanent magnet motor generator will not exceed the withstand voltage of the semiconductor elements or capacitors which are components of the inverter device. Furthermore, output of the permanent magnet motor generator is determined according to the size of the fundamental harmonic component of the induced voltage. For this reason, to further increase output of the permanent magnet type motor generator, it is necessary to reduce the volume of the permanent magnet and suppress the peak value of the induced voltage so that the size of the fundamental harmonic component of the induced voltage can be made larger.

Moreover, reactance is the impedance resulting from magnetic flux generated by the armature winding. However, by providing a groove on the q-axis, when an auxiliary salient pole is eliminated, reluctance torque becomes very low or it does not occur at all.

On the other hand, because a permanent magnet type motor generator uses a permanent magnet which generates magnetic flux all of the time regardless of whether the power is on or off, the rotor always receives a force which corresponds to the positional relationship between the permanent magnet and the rotor's salient pole, and the force pulsatively changes during rotation. As a result, a torque ripple appears, causing a problem since the smooth rotation of the rotor is inhibited and operation of the rotating electrical machine becomes unstable.

Torque T of the permanent magnet type motor generator is shown in the equation below.

$$T = P_n \phi_a i_q + P_n (L_d - L_q) i_d i_q$$

wherein, $P_n$ denotes the number of pole pairs.

$$\phi_a = \sqrt{3/2} \phi_f$$

wherein, $\phi_f$ denotes a maximum value of armature interlinkage magnetic flux generated by a permanent magnet, $L_q$ denotes d-axis inductance, $i_q$ denotes q-axis inductance, $i_d$ denotes d-axis winding current, and $i_q$ denotes q-axis winding current.

The first term of the equation indicates magnetic torque and the second term indicates reluctance torque. To increase torque, it is indicated that the magnet's magnetic flux should be large, an auxiliary salient pole should be provided, and the salient pole ratio ($L_d/L_q$) needs to be large.

However, if an auxiliary salient pole is provided and the reluctance torque is made high in order to increase torque, torque ripple ends up increasing. Because magnetic flux concentrates in the iron portion between magnets which function as auxiliary salient poles, the difference in magnetic flux density is large and a harmonic component is added to the induced voltage. This is because torque ripple tends to become large when a permanent magnet type motor generator whose induced voltage waveform is a distorted waveform driven by a sinusoidal current.

There is a well-known skewing method for reducing torque ripple in a permanent magnet type motor generator. Although skewing is effective for reducing torque ripple, problems arise in that the device configuration becomes complicated and copper loss is increased due to the reduction of output torque and the elongation of the armature winding.

The objective of the present invention is to provide a low noise, low vibration permanent magnet type motor generator and an electric vehicle which uses the permanent magnet type motor generator.

The present invention provides a permanent magnet type motor generator characterized in that a non-magnetic portion is created on both end portions of the circumferential width of a permanent magnet;

a distributed stator winding mounted to the stator core is provided;

a plurality of permanent magnets is embedded inside the rotor core;

a salient pole through which the magnetic flux of the permanent magnet passes and an auxiliary salient pole through which the magnetic flux passes from the rotor core to the stator core; and when the permanent magnet's magnetic flux axis is considered as the d-axis and an axis perpendicular to the d-axis is considered as the q-axis, a groove or hole is created on the q-axis located in the outer circumferential portion of the rotor core and between the adjacent magnetic poles in order to generate magnetic fluctuation to reduce torque ripple.

That is, by providing a groove or hole on the q-axis while obtaining reluctance torque generated from the auxiliary salient pole, it is possible to suppress torque ripple.

An advantage of the present invention is to provide a permanent magnet type motor generator which has small torque ripple, low noise, and low vibration by utilizing reluctance torque.

Moreover, the permanent magnet type motor generator according to the present invention can use any generator and motor, inner rotor and outer rotor, rotation type and linear type, and distributed stator winding.

DESCRIPTION OF THE PREFERRED EMBODIMENTS

A permanent magnet type motor generator according to the present invention comprises a stator and a rotor which is disposed oppositely to the stator with a gap interposed. The stator comprises a stator core and a distributed stator winding mounted to the stator core. The stator core comprises a ring-like yoke core and a plurality of teeth cores which protrude from the yoke core in the radial direction. The rotor comprises a rotor core and a plurality of permanent magnets embedded in the rotor core. A pair of non-magnetic portions is created inside the rotor core and on both sides of the circumferential width of a permanent magnet for one magnetic pole. In the rotor core located on the stator side of the pair of non-magnetic portions, a pair of magnetic paths is created as the result of the creation of the pair of non-magnetic portions. Furthermore, a groove or hole is provided on the outer circumferential portion of the rotor core and between the adjacent magnetic poles.

Furthermore, the rotor core comprises a salient pole through which the magnetic flux of the permanent magnet passes and an auxiliary salient pole through which magnetic flux passes from the rotor core to the stator core, and the number of magnetic poles is 8 or more but 20 or less.

Furthermore, the rotor core has a magnetic barrier, and the ratio of the number of magnetic poles of the permanent magnet to the number of teeth cores is 1:3.

Furthermore, when the angle of a permanent magnet is considered as $\theta_{pm}$ and the angle of one magnetic pole is considered as $\theta_r$, it is preferable that the permanent magnet's pole arc rate $\theta_{pm}/\theta_r$ be $0.65 \leq \theta_{pm}/\theta_r \leq 0.85$; and when the angle of a groove or hole is considered as $\theta_q$ and the angle of the one magnetic pole is considered as $\theta_r$, it is preferable that the permanent magnet's pole arc degree $\theta_q/\theta_r$ be $0.04 \leq \theta_q/\theta_r \leq 0.05$.

Furthermore, it is preferable that the location of a groove or hole correspond to the center position between a magnetic pole of a permanent magnet and an adjacent magnetic pole in the circumferential direction.

Furthermore, since the non-magnetic portion is triangular, it is preferable that the acute angle portion of the triangle be located on the inner-diameter side of the rotor. However, it is sufficient if the non-magnetic portion expands in the direction of the rotor's outer-diameter side.

It is preferable that the stator core according to the present invention be created by compressing iron powder; and by providing a drive motor, the motor generator can be used as a drive motor in a hybrid vehicle.

Hereafter, an embodiment of the present invention in this application will be explained with reference to the drawings.

Figure 1:
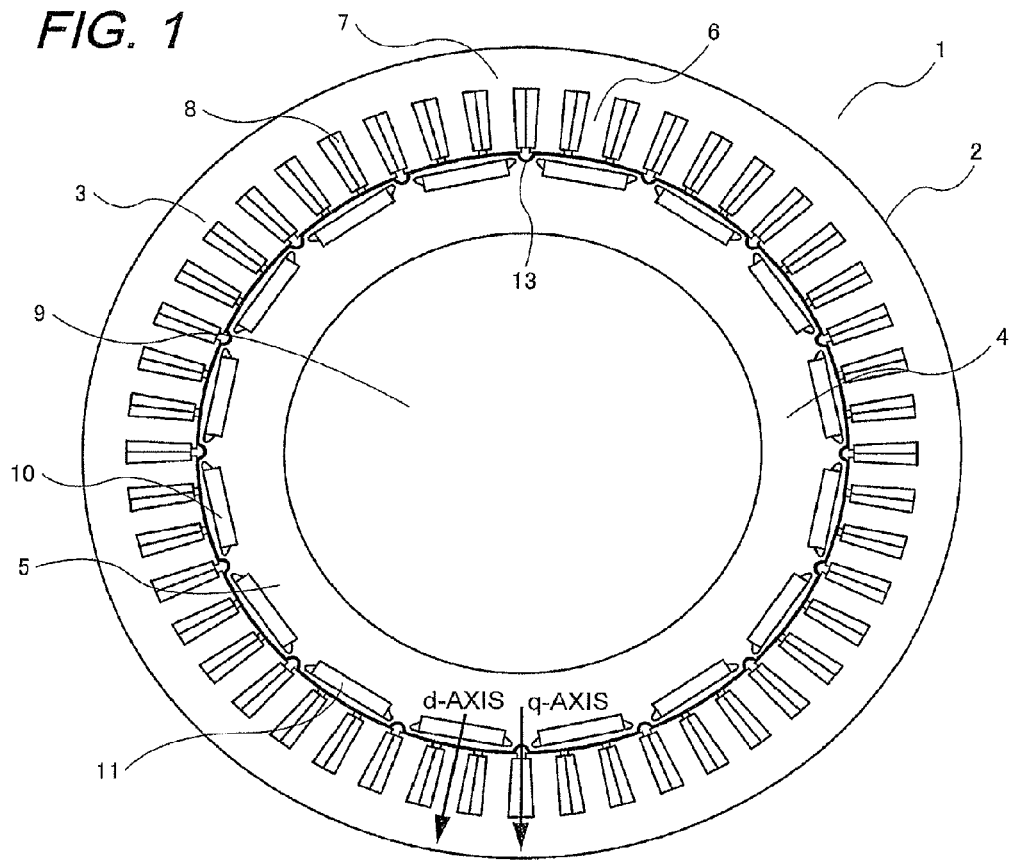
FIG. 1 is a cross-sectional view showing the configuration of a permanent magnet type motor generator which is an embodiment of the present invention in this application.

FIG. 1 shows a radial cross-section of a permanent magnet type motor generator which is an embodiment of the present invention in this application. In FIG. 1, a permanent magnet type motor generator 1 comprises a stator 2 and a rotor 4. The stator 2 comprises teeth 6, core back 7, and armature windings (distributed and three-phase winding: U-phase, V-phase, and W-phase windings) located in a slot 8 between the teeth 6.

The rotor 4 is created such that the rotor core 5 is jointly fixed to the rotation axis 9, and a rare-earth permanent magnet 11 is inserted in the axial direction into a permanent magnet insertion hole 10 created in the rotor core 5 so that the N-pole and the S-pole of magnets are alternately positioned. Moreover, the rotor core 5 is made by laminating a large number of silicon steel plates in which a permanent magnet insertion hole 10 is created. In the permanent magnet type motor generator 1, the permanent magnet's magnetic flux axis is considered as the d-axis and an axis perpendicular (electrical angle 90 degrees) to the d-axis is considered as the q-axis.

Figure 2:
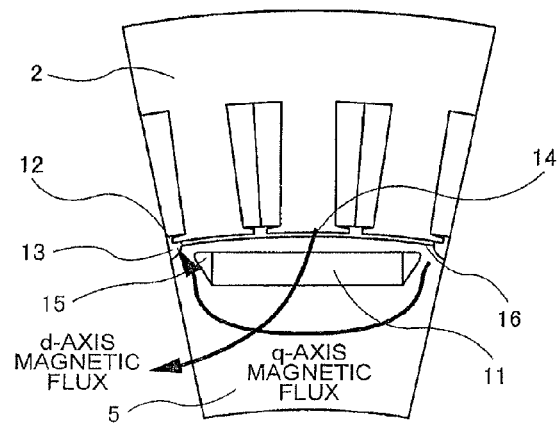
FIG. 2 is a cross-sectional view showing the configuration of a permanent magnet type motor generator which is an embodiment of the present invention in this application (enlarged view of 1/16th of FIG. 1)

FIG. 2 shows an enlarged view of 1/16th of the permanent magnet type motor generator, shown in FIG. 1, divided in the circumferential direction. The same alphanumeric character is assigned to the portion which is the same as that in FIG. 1. An opening 12 for each slot is created on the inner circumferential portion of the stator core. The rotor 4 is rotatably disposed inside the stator 2 with a predetermined gap 14 provided between the rotor and the inner circumferential portion of the stator core 3. To reduce torque ripple, a q-axis groove 13 is provided for each magnetic pole of the permanent magnet 11 on the outer circumferential surface of the rotor core 5. The q-axis groove 13 extends in the axial direction of the rotor core 5, is disposed between the adjacent magnetic poles, and is also located at a position that corresponds to the center of the q-axis.

A pair of magnetic barriers 15 made up of magnetic gaps (slits) is created on both end portions of the circumferential width of the permanent magnet in each magnetic pole of the rotor. The magnetic barrier 15 is intended for moderately decreasing the slope of the magnetic flux density distribution of the permanent magnet 11 located between both end portions of the circumferential width of the permanent magnet 11 in each magnetic pole of the rotor and the auxiliary salient pole portion 16. The magnetic barriers 15 are integrally-created with a permanent magnet insertion hole 10 so that it can be adjacent to the end portion of the circumferential width of the permanent magnet 11 when the permanent magnet 11 is inserted into the permanent magnet insertion hole 10. In the same manner as the permanent magnet insertion hole 10, the magnetic barriers 15 also penetrate from one end to the other end in the axial direction. Filler such as varnish can be used to fill in the magnetic barriers 15. In this embodiment in which magnetic barriers 15 are provided, cogging torque and torque ripple can be reduced. Furthermore, creation of the magnetic barriers 15 can reduce leaking magnetic flux from the permanent magnet 11.

As stated above, this embodiment has a so-called permanent-magnet embedded configuration. By disposing permanent magnets 11 in the rotor 4 in a circular arrangement, it is possible for a member located between mutually adjacent permanent magnet insertion holes 10 to function as an auxiliary salient pole portion 16.

That is, if the resultant vector of the armature magnetomotive force generated from the stator winding is controlled so that the vector is oriented toward the rotational direction side of the center position of the auxiliary salient pole, magnetic flux generated from the stator winding revolves around the permanent magnet 11 via an auxiliary salient pole portion 16, thereby generating reluctance torque. This is specifically effective during low-speed operation, and as the result of the addition of the above-mentioned reluctance torque to normal torque generated by the permanent magnet 11, high torque can be obtained to function as an electric motor.

Figure 3:
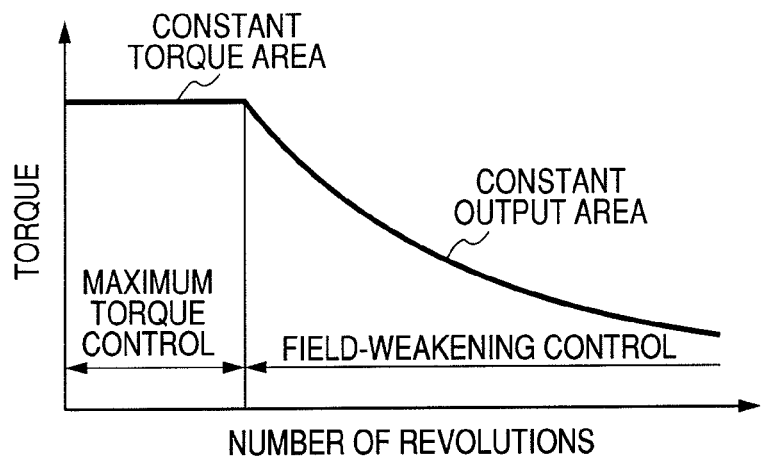
FIG. 3 shows a control method of a permanent magnet type motor generator which is an embodiment of the present invention in this application.

In a vehicle, since electric power that can be used inside the vehicle is limited, it is important to obtain as much high output as possible by using a small and light-weight system. FIG. 3 shows the revolution-torque characteristics required for a hybrid automobile drive motor. The motor is required to have high torque when rotating at low speed and must maintain high output throughout the time until the motor reaches high revolutions. Because induced voltage becomes high during high-speed revolution, an inverter is used to run current through the d-axis and run magnetic flux from the stator winding in the reverse direction of the magnetic flux of the permanent magnet, thereby executing a field-weakening control to inhibit the increase in induced voltage.

Figure 5:
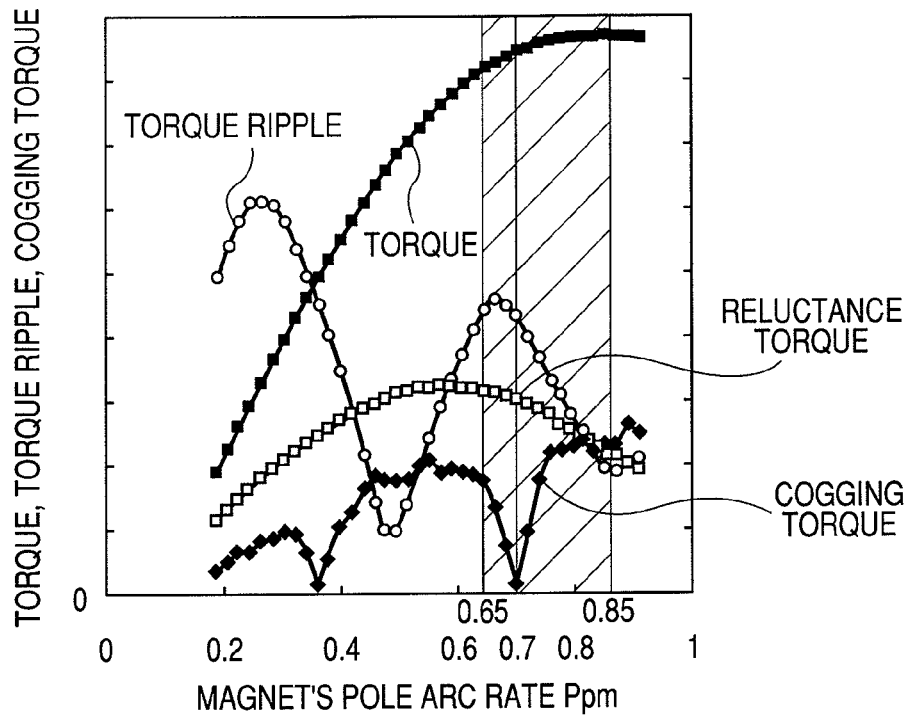
FIG. 5 shows the torque characteristics related to the pole arc degree of the magnet of a permanent magnet type motor generator which is an embodiment of the present invention in this application.

Torque of the embedded magnet type motor is the sum of the magnet torque and the reluctance torque. As shown in FIG. 5, magnet torque is almost proportional to the magnet pole arc degree when the magnet pole arc degree is from 0.2 to 0.6. Reluctance torque is generated by the difference between inductance $L_d$ of the vertical axis (d-axis) and inductance $L_q$ of the horizontal axis (q-axis). Generally, $L_q > L_d$ is established in the embedded magnet motor. This is because the magnet's magnetic permeability is almost equal to that of air and the magnetic resistance of the d-axis inductance which is oriented toward the magnet's direction is large. On the other hand, q-axis inductance is magnetic flux that flows through an auxiliary salient pole located between magnets. For this reason, when magnets are small, magnetic resistance in the d-axis direction cannot be made small. Therefore, d-axis inductance cannot be made small because in some cases, reluctance torque becomes low.

Figure 4:
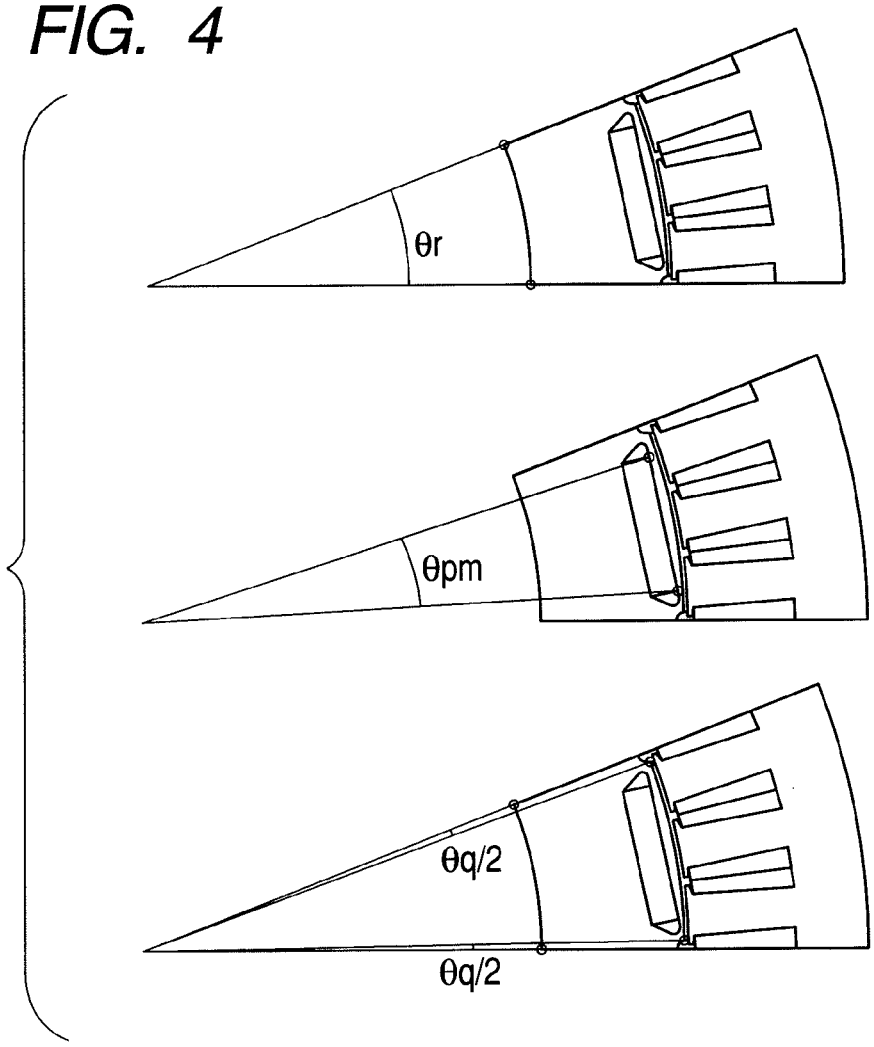
FIG. 4 shows an angle created between the magnet and the q-axis groove of the present invention in this application.

FIG. 4 shows an angle for one magnetic pole, magnet angle, and an angle of the q-axis groove. In this application, based on FIG. 4, the magnet pole arc degree $P_{pm}$ and q-axis groove pole arc degree $P_q$ are as shown in the equations below.

$$P_{pm} = \theta_{pm}/\theta_r$$

$$p_q = \theta_q/\theta_r$$

FIG. 2 shows a q-axis groove which is cut along the R diameter. When the q-axis groove is punched by a progressive press die, it is sufficient if the q-axis groove is punched during the final process. In that case, when the q-axis groove is the R diameter, punching is easy and costs can be reduced.

Furthermore, by providing a q-axis groove, the magnet rotor can be light-weight and the burden on the bearing can be reduced.

FIG. 5 shows the torque characteristics with regard to the magnet pole arc degree. Torque does not change when the magnet pole arc degree is from 0.65 to 1. This is because magnet torque decreases when the magnet pole arc degree becomes small, but reluctance torque increases. The utilization ratio of reluctance torque increases. However, on the contrary, as a result of the increase in reluctance torque, torque ripple increases. The reluctance torque utilization ratio and torque ripple have a trade-off relationship. Furthermore, it can be designed so that the cogging torque becomes minimal when the magnet pole arc degree is 0.7. By setting the magnet pole arc degree at a value between 0.65 and 0.85, the reluctance torque can be increased without reducing torque.

Moreover, by reducing the circumferential width of the permanent magnet, magnetic flux generated from the permanent magnet 11 decreases, but reluctance torque generated by the auxiliary salient pole relatively increases. This is effective in cases when expensive neodymium magnets are used as the permanent magnets. Reduction in the quantity of permanent magnets can reduce costs. By supplementing the reduction with reluctance torque in the auxiliary salient pole, cost performance can be improved.

Figure 6:
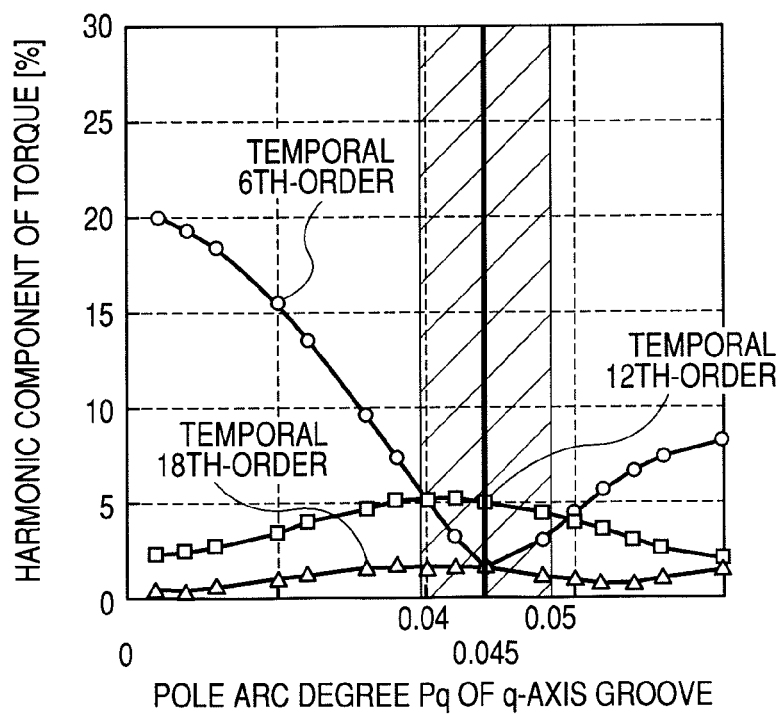
FIG. 6 shows the torque harmonic component generated from the q-axis groove of a permanent magnet type motor generator which is an embodiment of the present invention in this application.

On the other hand, in this application, as shown in FIG. 6, it is indicated that the harmonic component of torque changes according to the pole arc degree of the q-axis groove. Although the magnet pole arc degree is 0.7 in this drawing, the effect is the same as when the magnet pole arc degree is between 0.65 and 0.85. When the q-axis groove is not provided, the temporal sixth-order component is dominant in the torque ripple. However, by providing the q-axis groove, the temporal sixth-order harmonic component can be decreased. When the pole arc degree of the q-axis groove is 0.045, the value of the temporal sixth-order component is minimal. However, since the temporal twelfth-order and eighteenth-order torque harmonic components simultaneously increase, if the pole arc degree of the q-axis groove is between 0.04 and 0.05, the torque ripple can be reduced.

Figure 7:
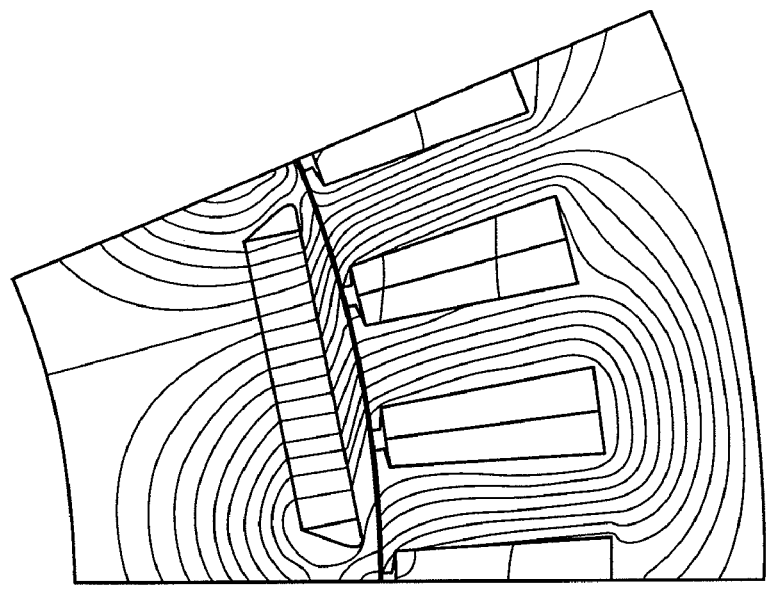
FIG. 7 is a magnetic flux diagram of a permanent magnet type motor generator having no q-axis groove which is an embodiment of the present invention in this application.
Figure 8:
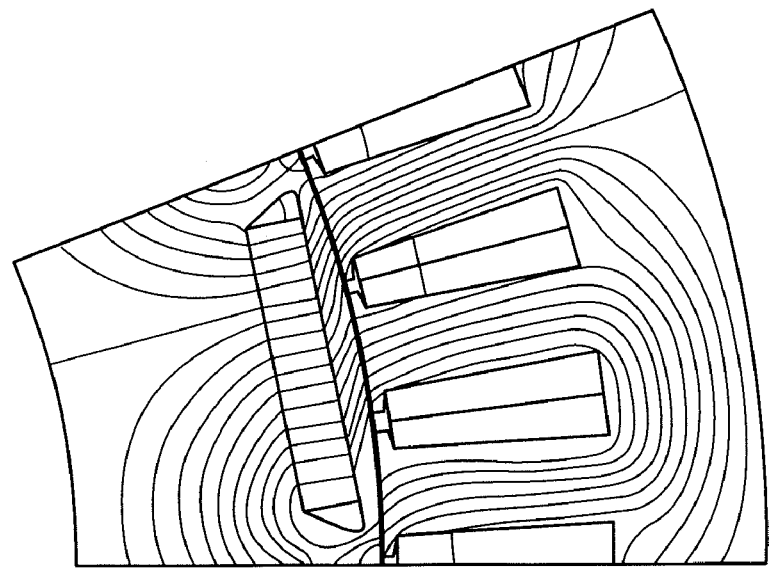
FIG. 8 is a magnetic flux diagram of a permanent magnet type motor generator having a q-axis groove which is an embodiment of the present invention in this application.

To compare the effects of the presence and absence of the groove near the rotor core surface in this application, FIG. 7 shows the magnetic field analysis for one magnetic pole when no groove is provided. FIG. 8 shows the magnetic field analysis result of the case where a groove is provided (q-axis groove pole arc degree=0.045). It becomes difficult to flow through magnetic flux into the opening 12 by the q-axis groove 13 in the auxiliary salient pole portion 16. For this reason, change by rotation of the magnetic resistance of the opening 12 becomes small, and the torque ripple also becomes small.

Figure 9:
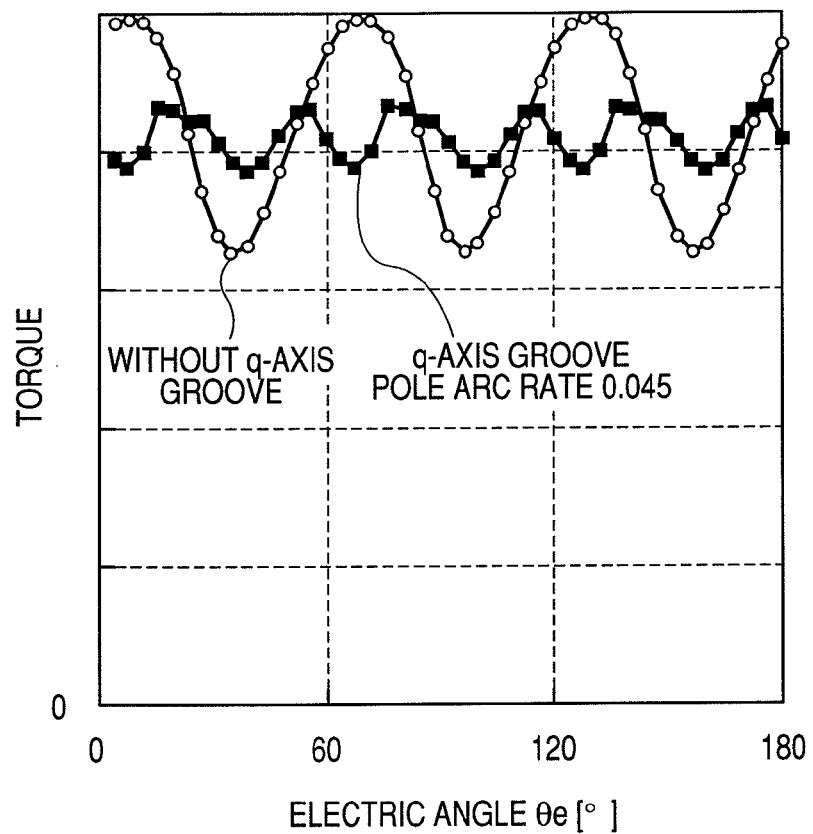
FIG. 9 shows the torque waveforms according to the presence or absence of the q-axis groove of a permanent magnet type motor generator which is an embodiment of the present invention in this application.

FIG. 9 shows torque waveforms according to the presence or absence of the q-axis groove. By providing a q-axis groove, torque ripple can be reduced by 73%. On the other hand, the area of the magnetic path is reduced due to the presence of the q-axis groove, and torque is reduced by 2%. As shown in the above-mentioned harmonic wave analysis, when no groove is provided, three waves are generated with regard to the electric angle of 180 degrees (sixth-order harmonic component). However, when a q-axis groove is provided, six waves are generated (twelfth-order harmonic component). Therefore, a reduction in the sixth-order harmonic component can also be confirmed according to the waveform.

Figure 10:
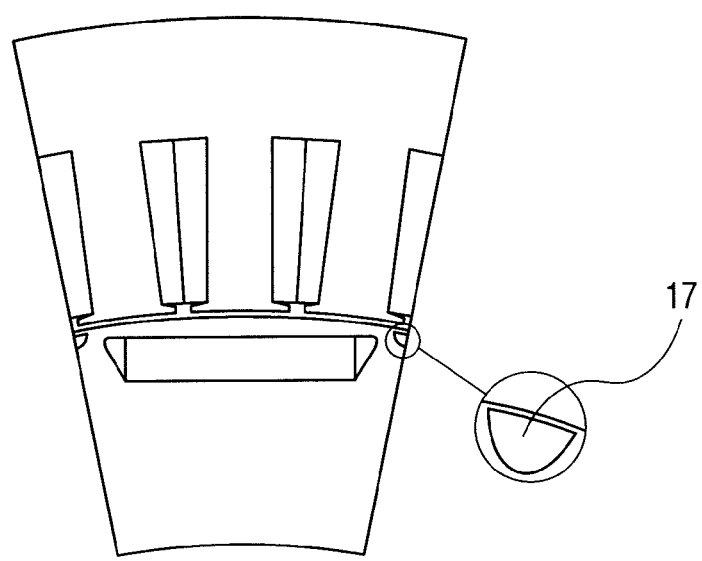
FIG. 10 is a cross-sectional view showing the configuration of a permanent magnet type motor generator which is an embodiment of the present invention in this application (enlarged view of 1/16th of the part).
Figure 11:
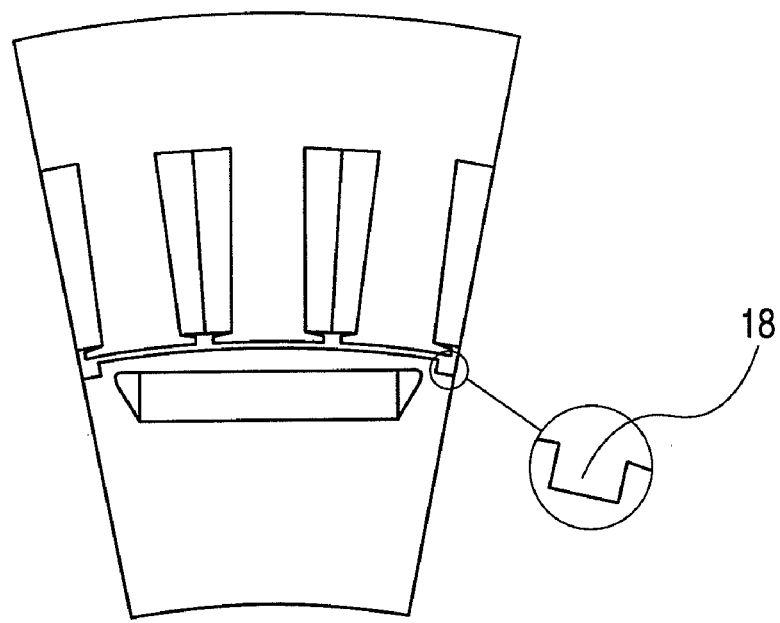
FIG. 11 is a cross-sectional view showing the configuration of a permanent magnet type motor generator which is an embodiment of the present invention in this application (enlarged view of 1/16th of the part).
Figure 12:
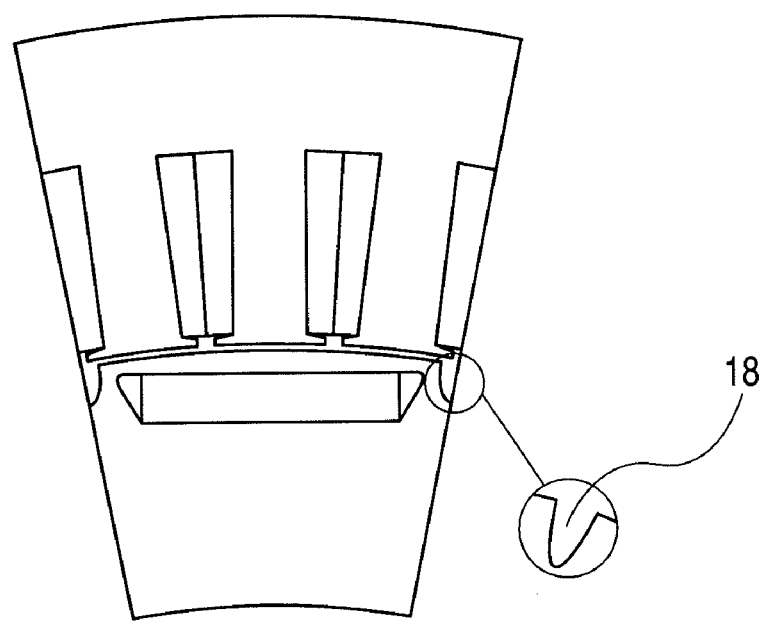
FIG. 12 is a cross-sectional view showing the configuration of a permanent magnet type motor generator which is an embodiment of the present invention in this application (enlarged view of 1/16th of the part).

Moreover, in this application, the shape of the magnet is not limited to the R diameter shown in FIGS. 1 and 2. The q-axis groove can be a variety of shapes. FIG. 10 shows a structure in which a q-axis hole 17 is made inside the rotor without machining the outer circumferential portion of the rotor. When a groove is created on the outer circumferential surface of the rotor, wind roar occurs during high-speed revolutions, causing vibration and noise. Therefore, a hole is made so that the outer circumferential surface of the rotor becomes circular. In this case, the thickness of the plate in the outer circumferential portion of the hole should be 1 mm or less so that magnetic flux will not occur due to magnetic saturation. FIG. 11 shows a square notch on the q-axis 18. FIG. 12 shows an elliptical q-axis groove 19.

Figure 13:
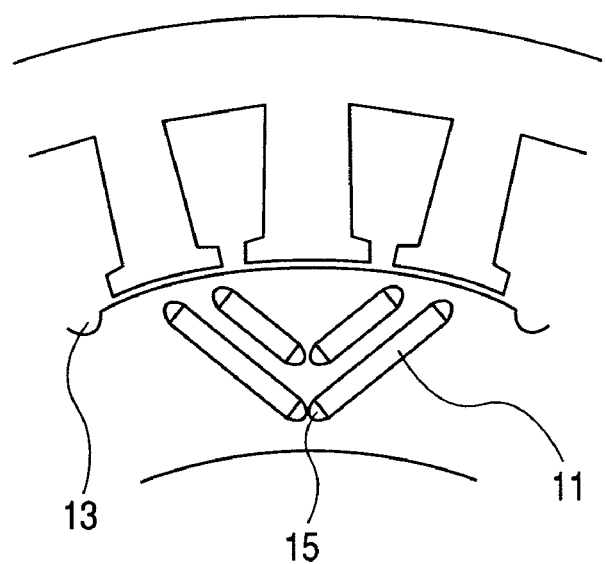
FIG. 13 shows the V-letter arrangement of permanent magnets of a permanent magnet type motor generator which is an embodiment of the present invention in this application.

Furthermore, FIG. 13 shows the V-letter arrangement of permanent magnets. The arrangement of the magnets is not intended to be limited to the one shown in this embodiment.

Figure 14:
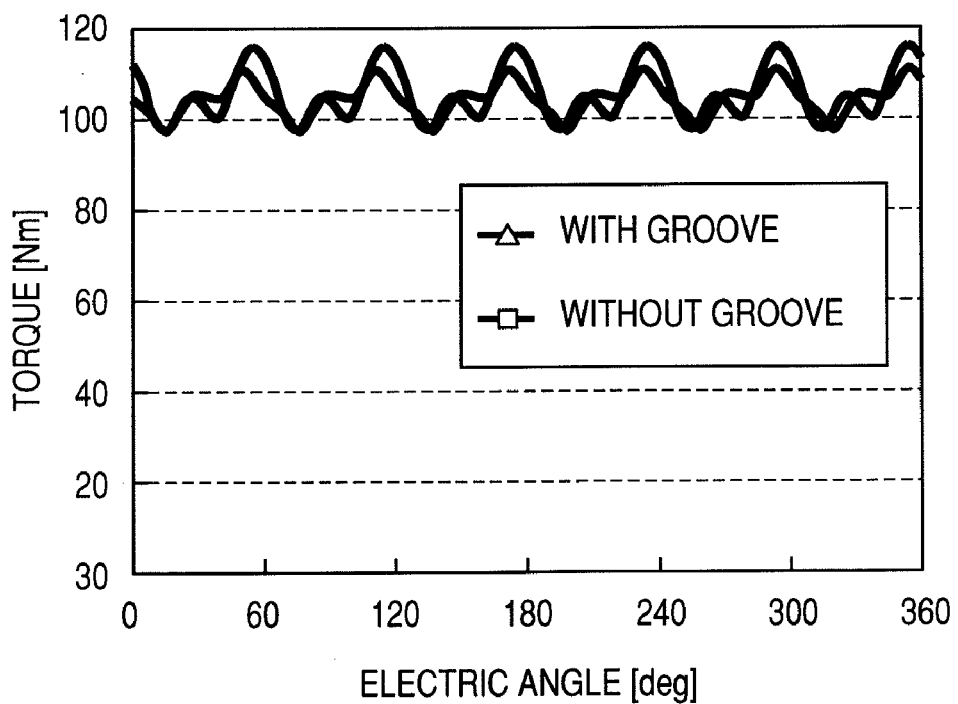
FIG. 14 shows the changes in torque ripple according to the presence or absence of a groove in a permanent magnet type motor generator which uses a stator core having concentrated stator winding.

FIG. 14 shows the change of torque ripple according to the presence and absence of the groove in a permanent magnet type motor generator which uses a stator core having a concentrated stator winding. When a concentrated winding is used, torque ripple does not change by providing a groove or hole on the outer circumferential portion of the rotor core and between the adjacent magnetic poles. This indicates that the effects of the present invention cannot be obtained by providing a groove or hole.

Figure 15:
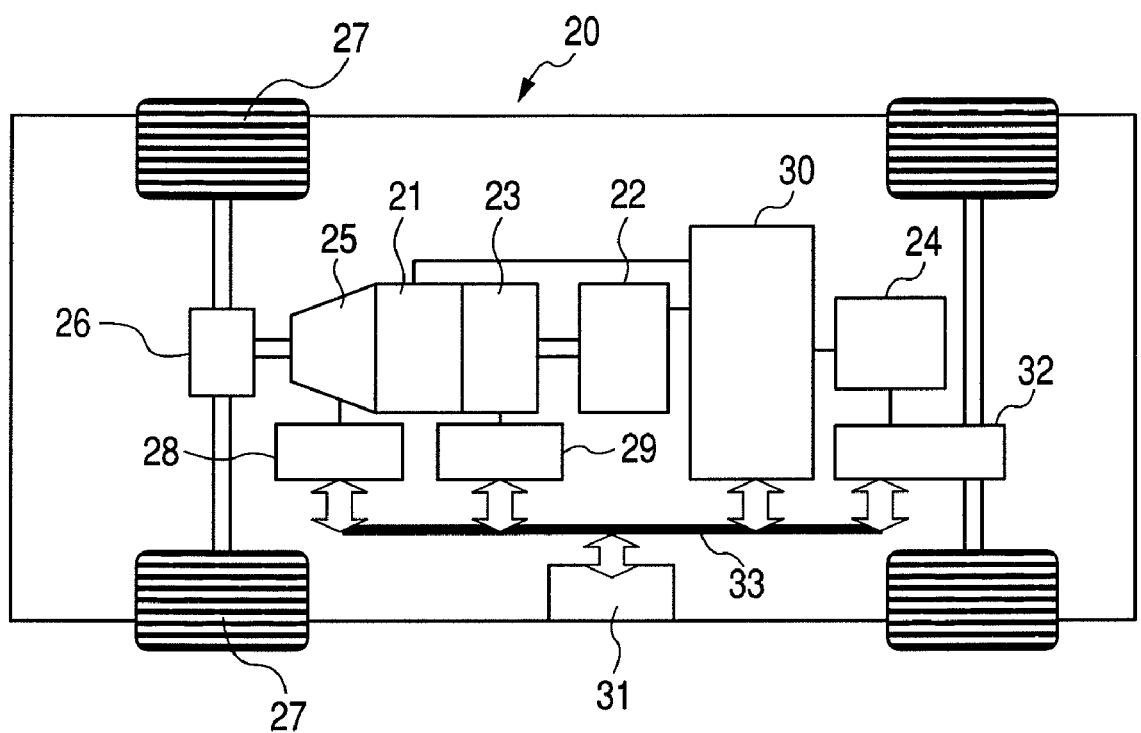
FIG. 15 shows an embodiment of a hybrid vehicle which incorporates a permanent magnet type motor generator according to the present invention.

FIG. 15 is a schematic diagram of an embodiment of a hybrid vehicle wherein a permanent magnet type motor generator which is a first embodiment of the present invention is installed. Although the permanent magnet type motor generator according to the present invention can be used for both a genuine electrical automobile and a hybrid vehicle, hereafter, as a typical example, an embodiment of a hybrid vehicle will be described.

A hybrid vehicle 20 comprises an engine 23, a first permanent magnet type motor generator 21, a second permanent magnet type motor generator 22, and a battery 24 which supplies high-voltage direct-current power to the first permanent magnet type motor generator 21 and the second permanent magnet type motor generator 22 or receives high-voltage direct-current power from the first permanent magnet type motor generator 21 and the second permanent magnet type motor generator 22. Furthermore, a battery which supplies 14-volt type low-voltage electric power is incorporated in the vehicle, and the battery supplies low-voltage direct-current power to the control circuit described below. However, the battery which supplies low-voltage power is not shown in the drawing.

Rotary torque generated by the engine 23, first permanent magnet type motor generator 21, and the second permanent magnet type motor generator 22 is conveyed to a transmission 25 and a differential gear 26 and then conveyed to the front wheels 27. A transmission control apparatus 28 for controlling the transmission 25, an engine control apparatus 29 for controlling the engine 23, a permanent magnet type motor generator control circuit for controlling the power converter 30, a battery control apparatus 32 for controlling the battery 24, such as a lithium-ion battery, and an integrated control apparatus 31 are connected by communication line 33.

Via the communication line 33, the integrated control apparatus 31 receives information about each device's operating condition from the lower-order control apparatuses which are the transmission control apparatus 28, engine control apparatus 29, power converter 30, and the battery control apparatus 32. Based on the information, the integrated control apparatus 31 calculates a control command for each control apparatus, and each control command is transmitted from the integrated control apparatus 31 to each control apparatus via the communication line 33.

For example, the battery control apparatus 32 reports the electric discharge condition of the battery 24, which is a lithium-ion battery, and the condition of each unit cell battery, which is a component of the lithium-ion battery, to the integrated control apparatus 31 as the condition of the battery 24 via the communication line 33.

Based on the above report, when the integrated control apparatus 31 determines that the battery 24 needs to be charged, the apparatus sends an instruction to the power converter 30 for the charging operation. The integrated control apparatus 31 also controls output torque of the engine 23 and the first and second permanent magnet type motor generators 21 and 22, calculates the total torque or torque distribution ratio of the output torque generated from the engine and the first and second permanent magnet type motor generators 21 and 22; and based on the processing results, the integrated control apparatus 31 transmits control commands to the transmission control apparatus 28, engine control apparatus 29, and the power converter 30. Based on the torque command, the power converter 30 controls the first permanent magnet type motor generator 21 and the second permanent magnet type motor generator 22 so that either one permanent magnet type motor generator or both of the permanent magnet type motor generators are used to generate the required torque output or generate electric power.

Based on the command sent from the integrated control apparatus 31, the power converter 30 controls the switching operation of power semiconductors, which are components of the inverter, in order to operate the first permanent magnet type motor generator 21 and the second permanent magnet type motor generator 22. As a result of the switching operation of those power semiconductors, the first permanent magnet type motor generator 21 and the second permanent magnet type motor generator 22 are operated as an electric motor or a power generator.

When either of the permanent magnet type motor generators is operated as an electric motor, direct-current power is supplied from the high-voltage battery 24 to the direct-current terminal of the inverter of the power converter 30. By controlling the switching operation of the power semiconductors of the inverter, the supplied direct-current power is converted to three-phase alternating-current power and then supplied to either the first permanent magnet type motor generator 21 or the second permanent magnet type motor generator 22. On the other hand, when either the first permanent magnet type motor generator 21 or the second permanent magnet type motor generator 22 is operated as a power generator, the rotor of either the first permanent magnet type motor generator 21 or the second permanent magnet type motor generator 22 rotates by the externally applied rotary torque, and based on the rotary torque, three-phase alternating-current power is generated in the stator winding of the corresponding permanent magnet type motor generator. The generated three-phase alternating-current power is converted to direct-current power by the power converter 30, and the direct-current power is supplied to the high-voltage battery 24, and then the battery 24 is charged by the direct-current power.

As shown in FIG. 15, the power converter 30 comprises a plurality of smoothing capacitor modules which inhibit voltage fluctuation of the direct-current power source, a power module which incorporates a plurality of power semiconductors, a switching drive circuit which controls the switching operation of the power module, and a permanent magnet type motor generator control circuit which includes a circuit that generates a signal for determining the time duration of the switching operation, that is, a PWM signal for controlling pulse wide modulation.

The high-voltage battery 24 is a secondary battery, such as a lithium-ion battery or nickel hydride battery. Direct-current power voltage from 250 to 600 volts or higher is either directed to charge the secondary battery or is outputted from the secondary battery

What is claimed is:

1. A permanent magnet motor comprising:
    a stator, and a rotor disposed oppositely to the stator with a gap interposed;
    said stator comprising a stator core, and a distributed stator winding mounted to the stator core;
    said stator core comprising a ring-shaped yoke core, and a plurality of teeth cores protruding radially from the yoke core;
    said rotor comprising a rotor core, and a plurality of permanent magnets embedded inside the rotor core;
    said rotor core comprising a salient pole through which magnetic flux passes and an auxiliary salient pole through which magnetic flux passes at both outsides of the salient pole from the rotor core to the stator core in order to generate reluctance torque;
    a pair of non-magnetic portions being created inside said rotor core and on both sides of the circumferential width of said permanent magnet for one salient pole;
    a ratio of the number of said salient poles of said permanent magnet in the rotor core to the number of said teeth cores with distributed stator windings is 1:3;
    a groove of size smaller than width between the two magnets constituting the two adjacent salient poles, is provided on near center between the two adjacent salient poles, and extends in the axial direction of the rotor on the outer circumferential surface of the rotor core,
    when an angle of said permanent magnet is considered as $\theta_{pm}$ and an angle of said one salient pole is considered as $\theta_r$, said permanent magnet's pole arc rate $\theta_{pm}/\theta_r$ is $0.65 \leq \theta_{pm}/\theta_r \leq 0.85$; and
    when an angle of said groove or hole is considered as $\theta_q$ and an angle of said one salient pole is considered as $\theta_r$, said permanent magnet's pole arc degree $\theta_q/\theta_r$ is $0.04 \leq \theta_q/\theta_r \leq 0.05$.

2. The permanent magnet motor according to claim 1, wherein
    the number of said salient poles is 8 or more but 20 or less.

3. The permanent magnet motor according to claim 1, wherein
    said non-magnetic portion is triangular, and
    the acute angle portion of said triangle is located on the inner-diameter side of said rotor.

4. The permanent magnet motor according to claim 1, wherein
    said non-magnetic portion expands in the direction of said rotor's outer-diameter side.

5. The permanent magnet motor according to claim 1, wherein
    said stator core is created by compressing iron powder.

6. A hybrid vehicle which has a drive motor and uses a permanent magnet motor according to claim 1 as a drive motor.

7. The permanent magnet motor according to claim 1, wherein
    said non-magnetic portion expands in the direction of said rotor's outer-diameter side.

8. The permanent magnet motor according to claim 1, wherein
    said rotor core has a magnetic barrier.

* * * * *